United States Patent [19]

Gardner, Jr.

[11] Patent Number: 4,865,152

[45] Date of Patent: Sep. 12, 1989

[54] ELECTROHYDRAULIC VEHICLE DRIVE SYSTEM

[76] Inventor: Elmer W. Gardner, Jr., 3359 Alexis Rd., Cincinnati, Ohio 45239

[21] Appl. No.: 880,547

[22] Filed: Jun. 30, 1986

Related U.S. Application Data

[63] Continuation-in-part of Ser. No. 850,996, Apr. 10, 1986, Pat. No. 4,753,078.

[51] Int. Cl.[4] .......... B60K 9/04

[52] U.S. Cl. .......... 180/305; 60/668; 74/127; 180/165

[58] Field of Search .......... 180/302, 303, 305, 165, 180/45.2; 74/89.14, 89.15, 30, 127; 60/668

[56] References Cited

U.S. PATENT DOCUMENTS

| | | | |
|---|---|---|---|
| 381,160 | 4/1888 | Moon | 74/127 |
| 594,741 | 11/1897 | Harwood | 74/127 |
| 848,703 | 4/1907 | Taylor | 74/127 |
| 1,578,883 | 3/1926 | Estes | 180/302 |
| 2,974,646 | 3/1961 | Miller et al. | 74/89.15 |
| 3,980,152 | 9/1976 | Manor | 180/165 |
| 4,253,551 | 3/1981 | Calabrese | 74/89.14 |
| 4,590,767 | 5/1986 | Gardner | 180/165 |
| 4,753,078 | 6/1988 | Gardner | 180/305 |
| 4,763,751 | 8/1988 | Gardner | 180/305 |

FOREIGN PATENT DOCUMENTS

| | | | |
|---|---|---|---|
| 64757 | 4/1913 | France | 74/127 |

*Primary Examiner*—David M. Mitchell

[57] ABSTRACT

A power drive system highly adaptable for non stationary vehicle drive in which a battery powered electric motor is mechanically coupled to a hydraulic pump for pressurizing hydraulic fluid that is fed to a cylinder motor that is operably connected to one end of a non rotatable worm screw gear that is reciprocably and rectlinearly driven inside and output shaft for engagement to a series of clutches and gears positioned therein for providing rotation to the output shaft that is operably connected at the other end to the drive shaft, universal or differential of a standard vehicle for providing rotation to the wheels of said vehicle.

2 Claims, 9 Drawing Sheets

ELECTROHYDRAULIC VEHICLE DRIVE SYSTEM

BRIEF SUMMARY OF THE INVENTION

With this invention a piston driven hydraulic motor is used for reciprocatably driving at least two non rotatable worm screw gears for providing rotatable motion to an output shaft. The hydraulic motor comprises a standard cylinder with input and output valves, preferably the electric solenoid type but manual cam operated valves can be used, connecting pipelines for the discharge of expended fluid to a reservoir and an accumulator for storing pressurized fluid that is fed from a hydraulic pump that is mechanically connected to a 36 volt DC electric motor that receives current from a storage battery.

The output shaft comprises a hollow tubular shaft supported at each end and to its center by rotatable bearings adapted to stationary mounts. The shaft is open at one end for the input of a worm screw gear and the other end is connected to a universal joint and differential at the rear axle housing of a standard vehicle. The worm screw gear and the output shaft both are arranged for selective engagement/disengagement by the application of an electric clutch mechanism that separates the worm screw gear at the open end of the shaft to a control arm that is operatively connected to a piston rod by means of a rack and pinion gear for driving the worm screw gear rectilinearly and reciprocatably inside the output shaft. The second clutch mechanism is adapted at the closed end of the output shaft as an operative connection to the universal joint, and both clutches are operator controlled for disengagement during vehicle deceleration and braking and for engagement during vehicle acceleration.

Bearings are mounted inside each end of the output shaft for slidable engagement to the worm screw gear that, as it is driven back and forth inside the output shaft, makes engagement to at least two separate freely rotatable rectangular gears each being fixed to two separate freely rotatable clutches, one driven away from a flywheel and the other against a flywheel and vice versa. The flywheels are fixed to the inside of the output shaft, thereby providing rotation to the output shaft. This invention is an improvement in that a long worm screw gear can be used to drive the output shaft. This allows for most of the power strain to be transferred to the worm screw gear. The longer the worm screw gear the greater the efficiency of the unit, as there also is less number of strokes at the cylinder, considerable reduction in friction and heat and a greater ability for increasing the speed in the transfer of power to the drive wheels of a vehicle.

This method also allows for the adaptation of the hydraulic drive system to any rear wheel drive vehicle with very little changeover, whereas the power drive is mounted in the same position as the transmission after its removal, and the pumps, electric motor and hydraulic cylinder can be located in the engine compartment after removal of the engine from the vehicle. Also, a clutch mechanism is adapted to either end of the worm screw gear which permits its free movement and disengagement to the drive elements during braking or deceleration. An alternator/generator and compressor is adapted to the output shaft of the power drive system for the recovery of kinetic energy during deceleration and braking of the vehicle.

Each clutch mechanism is connected at the end of a slidable second hollow shaft through which the worm screw gear reciprocates, that is positioned to the center of each of the two flywheels. The clutches can be the friction type, similar to that used in the standard vehicle clutch, though no pressure plate is used because the force of the screw provides adequate pressure in driving the clutch for rotating the flywheel. And as there are two separate worm screw gears, each having a single and different direction of screw pitch, one with the right hand pitch and the other with a left hand ptich, and each gear is operative to a separate output shaft with both screw gears connected to a common piston rod that is driven by a loaded cylinder.

Enclosed inside the output shaft and in working relationship to the worm screw gear are a series of slidable bearings that provide support and stabilization to its movement, and both flywheels are counterbalanced and arranged for storing energy. To the external surface of the output shaft are at least two large bearings and a series of smaller bearings that provide support to its rotational movement.

This invention is an improvement to other drive systems in that it is highly desirable for non stationary vehicle application where the necessity if for high torque and power with a variable horsepower range that can be assembled in a small space with a minimum of weight, that is considerably reduced compared to present drive systems.

Also this drive system is quite versatile in that a series of output shafts, each having a worm screw gear with a different arrangement of screw pitch, arranged in a cluster and having a gear adapted to each output shaft connected to a common gear box with a speed and gear shift control, either manual or automatic, for selectively providing power separately to each drive unit as needed and for the desired speed ratio.

OBJECTS OF THE INVENTION (1) to reduce the weight of a power drive system
(2) to increase the efficiency of a power drive system
(3) to help reduce air pollution by the application of a power drive system that reduces the reqirement-for the application fossil fuel
(4) to simplify installation and reduce maintenance requirements for a vehicle drive system

DETAILED DESCRIPTION OF THE INVENTION

Figure 1:
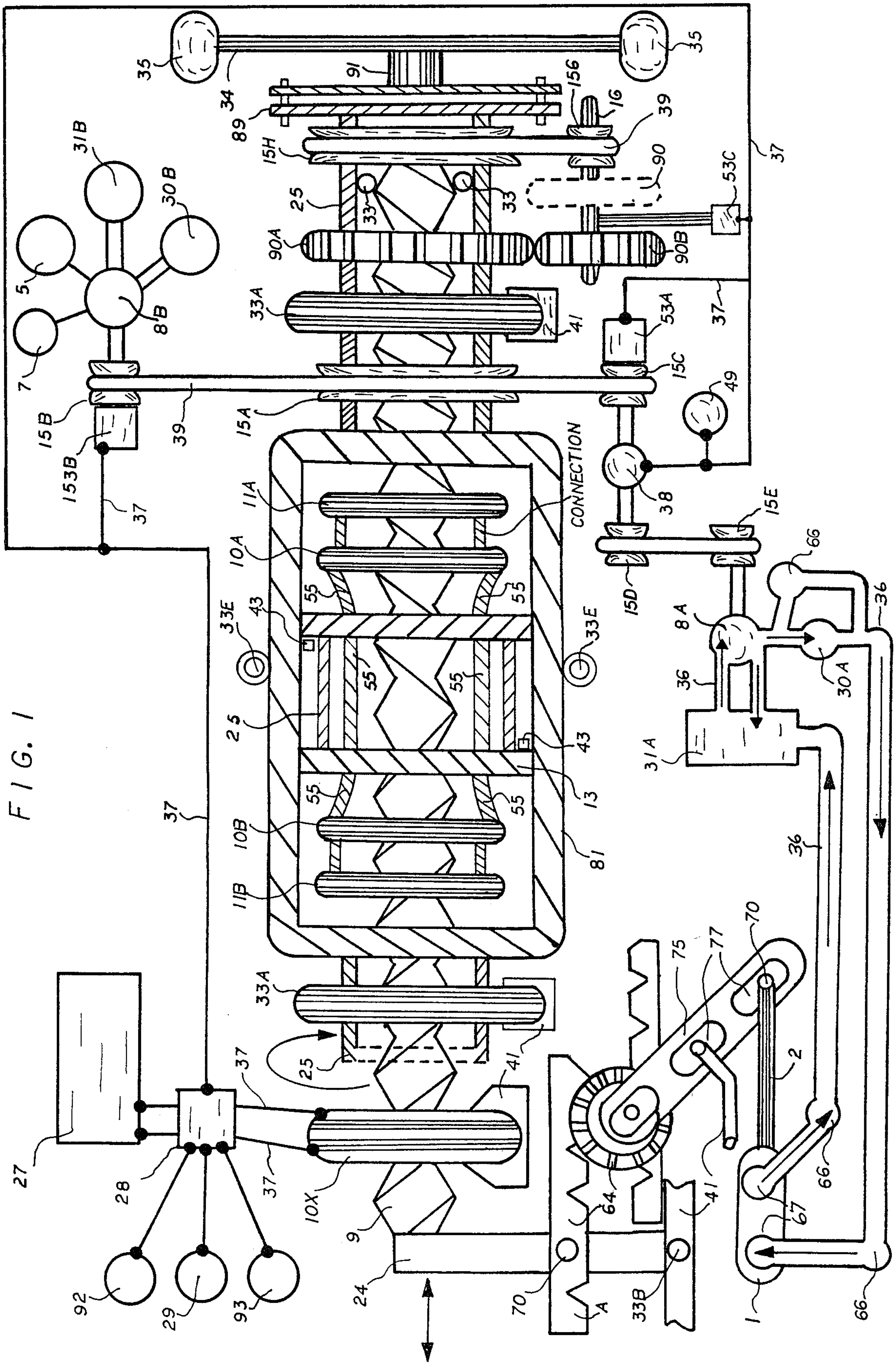
FIG. 1 is a drawing showing a worm screw gear arrangement for reciprocation inside a hollow rotatable output shaft by the application of connecting elements to a single rod cylinder with the other end of the output shaft connected to a universal joint for driving the differential and axles of a vehicle, including kinetic energy recovery equipment, the hydraulic system and the electrical switching arrangement FIG. 2 this drawing is similar to that of FIG. 1 and shows the clutch arrangement for selectively engaging and disengaging the worm screw gear and also the output shaft
Figure 2:
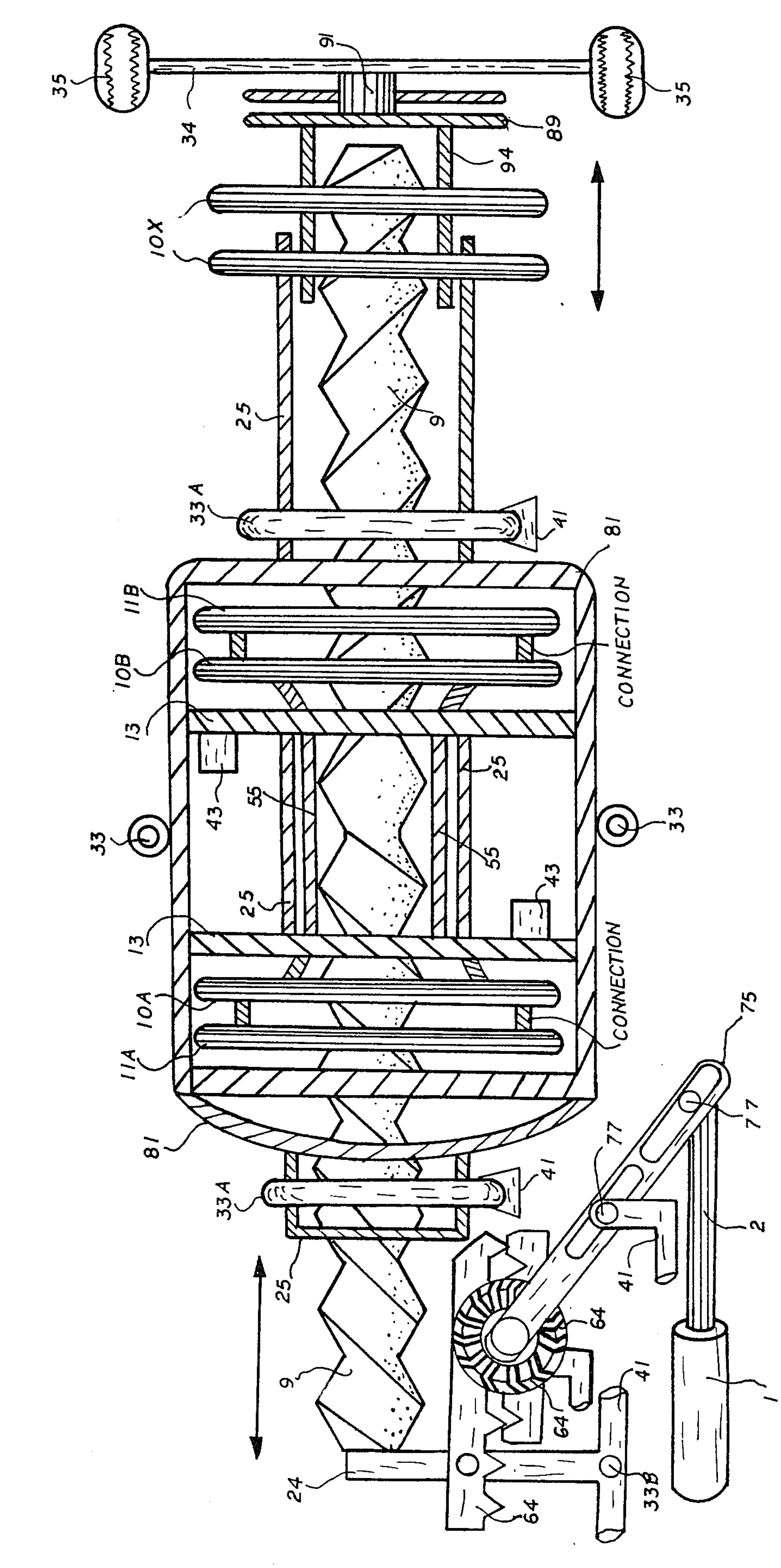

The drawings as disclosed herein are basically illustrative of a mechanical method for converting reciprocating motion to rotary motion by the application of a screw gear for driving the wheels of a vehicle. The drawings for FIG. 1 and FIG. 2 are basically the same with the exception of FIG. 1 in which there is disclosed the adaptation of kinetic energy recovery equipment and its arrangement to an output shaft 25, an electric motor 38 for driving a hydraulic pump 8A and a reverse gear arrangement to the output shaft 25. FIG. 1 and FIG. 2 are also similar to the illustration in FIG. 9 that discloses the arrangement for the operation of two separate worm screw gears 9 to the inside of two separate output shafts 25.

Figure 3:
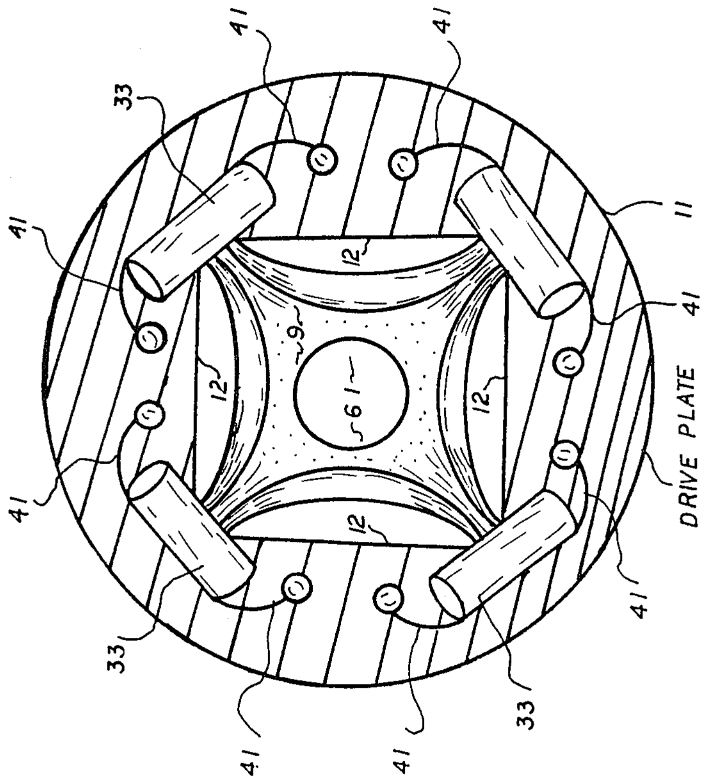
FIG. 3 is a drawing illustrative of a series of bearings arranged to the rectangular or square gear for making engagement to a worm screw gear
Figure 4:
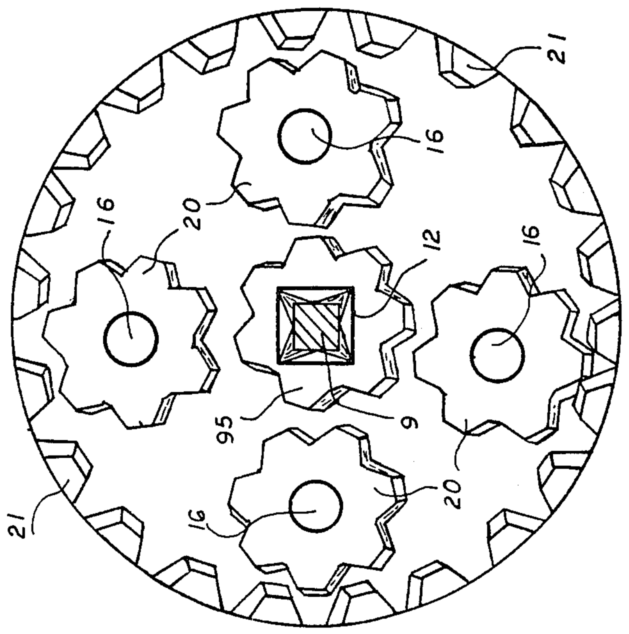
FIG. 4 is a drawing showing the arrangement of the worm screw gear and the rectangular gear connectably arranged to a series of rotatable planetary gears that are connected to a fixed sun gear and a rotatable inner ring gear
Figure 5:
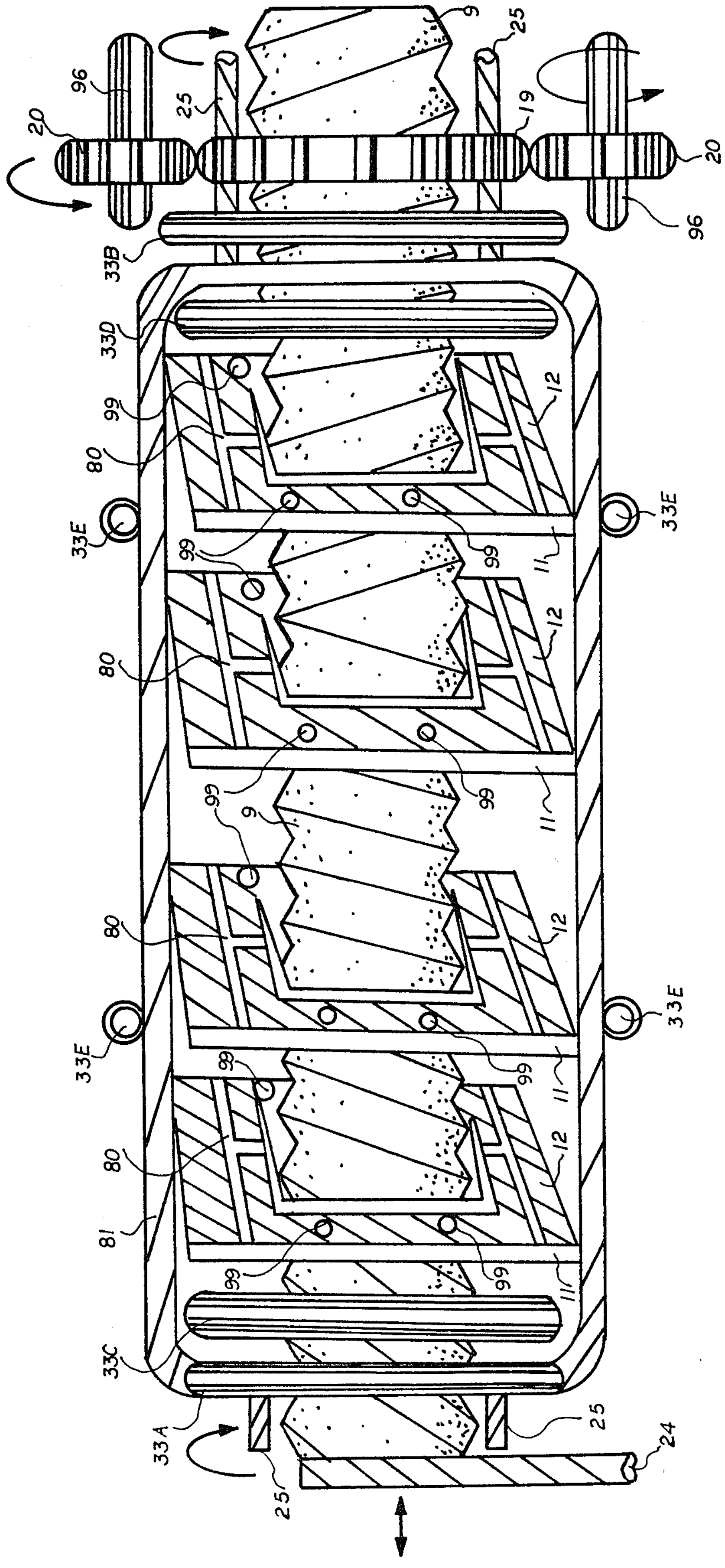
FIG. 5 is a drawing showing a worm screw drive in which the output shaft is one single unit that is fixed to a series of rectangular gears having movable gates for engagement/disengagement to the worm screw gear
Figure 6:
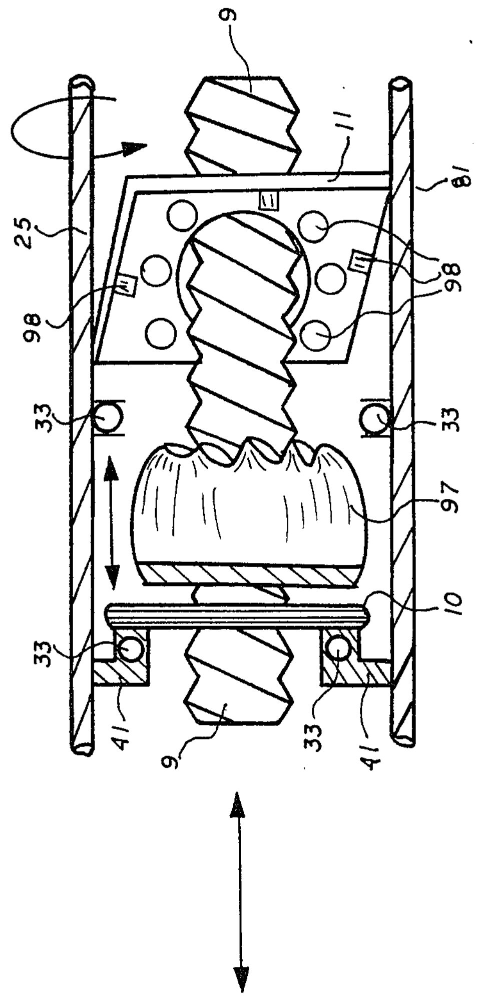
FIG. 6 is a drawing of a cambered gear, serving as a clutch, having a rectangular or square to its center for engagement to a worm screw gear
Figure 7:
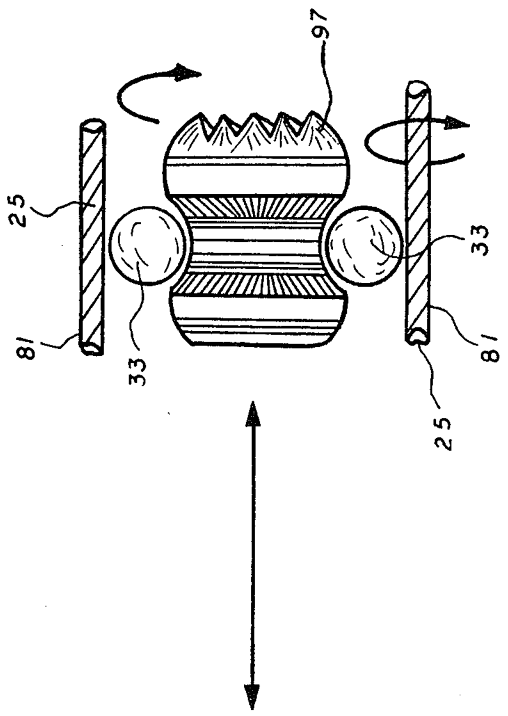
FIG. 7 is a drawing similar to FIG. 6 showing a cambered gear in relation to a series of bearings for controlling its movement inside the output shaft and its connection to a worm screw gear
Figure 9:
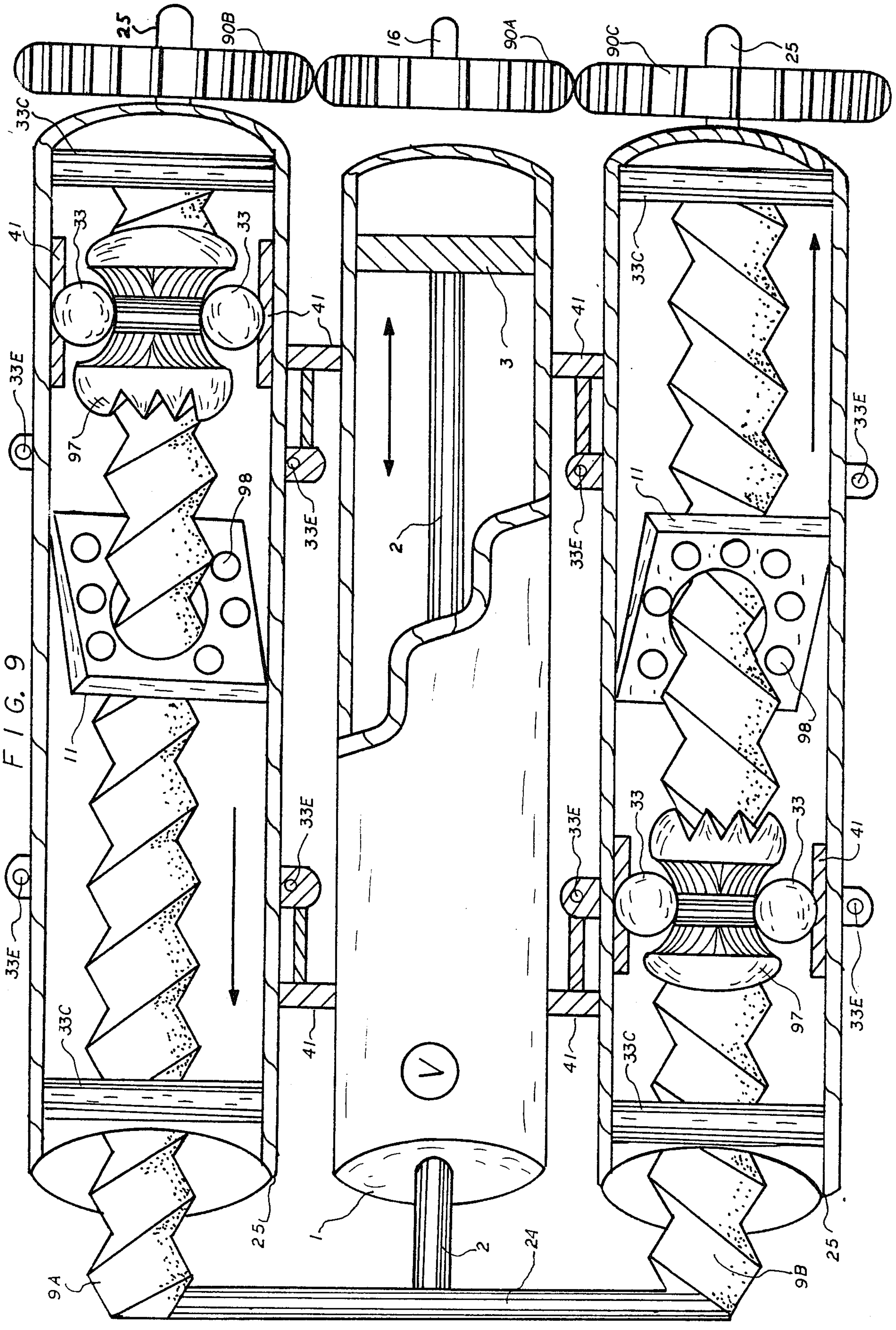
FIG. 9 is a drawing showing a dual drive in which there are two separate worm screw gears, one with a right hand and the other with a left hand screw pitch operable to a single piston rod cylinder

FIG. 5 is dissimilar to the other drawings in that there is a different type of clutch mechanism operative to the output shaft 25. The drawing for FIG. 3 is illustrative of a method for reducing friction and wear to a metal drive plate 11 at the rectangular or square gear opening formed therein. FIG. 4 shows a compound gear arrangement operative to a worm screw gear 9. FIG. 6, FIG. 7 and FIG. 9 are descriptive of an alternative method other than the friction clutch as disclosed in FIG. 1 and FIG. 2 for engagement/disengagement of a worm screw gear 9 to an output shaft 25.

With this invention, as disclosed in drawings FIG. 1, FIG. 2, FIG. 3, FIG. 5, FIG. 8 and FIG. 9 in which a non rotatable worm screw gear 9 is driven reciprocatably in rotating an output shaft 25, it is necessary that there be a means for engaging and disengaging the worm screw gear 9 from the drive element during its reciprocation.

The least expensive and a simplified method is the application of a clutch mechanism 10A and 10B similar to that used in the standard vehicle. Several variations for engaging and disengaging the worm screw gear 9 as it is reciprocated are outlined in the drawings as explained later on in the disclosure.

Drawings for FIG. 1 and FIG. 2 are illustrative of two separate friction clutch mechanisms 10A and 10B, each being separately connected to and driven by a clutch drive plate 11A and 11B, FIG. 3 having to its center a square or rectangular gear 12 opening through which the worm screw gear 9, containing a hollow shaft 61 therein, FIG. 1, FIG. 2, FIG. 3, FIG. 5, FIG. 6, FIG. 8 and FIG. 9, is operably connected to be driven reciprocatably and rectilinearly by a common connection 24 to a single rod 2 loaded cylinder 1. (this is more fully explained later)

In FIG. 3, as explained in the above, each clutch drive plate 11A and 11B has a rectangular or square gear 12 opening to its center proportionate in width and length and outer circumference to a hollow shaft 61 worm screw gear 9 that can reciprocate therein, causing the clutch drive plates 11A and 11B to rotate. However, because the screw pitch of the worm screw gear 9 makes metal to metal contact at each of the four corners inside the rectangular or square gear 12 as it is reciprocated back and forth therein, a method for reducing friction and for providing greater stability to the engagement of the worm screw gear 9 and its screw pitch as it makes contact at each corner of the rectangular or square gear 12 therein, is by positioning a bearing 33 at a stationary mount to the metal clutch drive plates 11A and 11B at each corner that form the rectangular or square gear opening that permits the worm screw gear 9 to slidably make engagement to the rectangular or square gear 12 with a reduction in friction and also with less wear and stress to the operating elements. The preferred embodiment for this invention is for the bearings 33 to be adapted at each of the four corners of the rectangular or square gear 12 opening so that the screw pitch of the worm screw gear 9 will make operable contact therof during its reciprocation therein.

FIG. 1, FIG. 2, FIG. 5 and FIG. 9 are illustrative of the arrangement of bearings 33A, 33B, 33C, 33D and 33E that are positioned outside the output shaft by means of bearing mounts 41 for stabilizing the outside during its rotation. Bearings 33 are also adapted to the inside of the output shaft 25, that make contact to the worm screw gear 9 and to the inner shaft 25 wall, and that slide back and forth to the movement of the worm screw gear 9. As disclosed in FIG. 5 bearings 33E are stationary mounted 41 to the outside of the shaft 25 and bearings 33A, 33B, 33C and 33D are located on the inside of the shaft 25. These bearings allow for free movement of the worm screw gear 9 during its reciprocation therein.

In all the drawings there is disclosed a tubular hollow shaft 25 that is open on one end, that is called the drive end, for the input of a worm screw gear 9 with the other end of the shaft 25 being closed for the connection to a driven element.

The application described herein is for driving the wheels of a vehicle. The open end of the shaft 25 could be positioned at the front engine compartment of a vehicle (not shown) that could extend the length of the vehicle at the undercarriage for connection at the drive end to either the drive shaft or the differential of a vehicle. The preferred embodiment is for the application of a long screw drive that provides for a greater power advantage with a pneumatic or hydraulic cylinder arrangement as is applicable with this invention. The longer the piston stroke at the cylinder, the less number of piston strokes required and less turn around energy that is required for its operation on the return stroke.

FIG.1 and FIG. 2, are illustrative of a friction type clutch 10A and 10B arrangement with each clutch being fixed to a clutch drive plate 11A and 11B having a rectangular or square gear (not shown) (but shown in FIG. 3) to its center for making engagement to a worm screw gear 9 as it is reciprocated inside the output shaft 25 (as previously explained) by a loaded clyinder 1 and a piston rod 2. The piston rod 2 is connected to a series of slots 77 and bolts 70 comprising an arm 75 that is connected to a rotatable pinion gear 64 for making engagement to a fixed rack gear 64 and a movable rack gear 64A that is connected for driving a control arm 24 adapted by a bolt and slidable bearings 33 to a stationary mount 41. The control arm 24 is connected for reciprocatably driving one end of worm screw gear 9, with the other end of the worm screw gear 9 freely suspended to bearings 33 (as previously explained) at the other end of the output shaft 25.

FIG. 9 is illustrative of a direct connection arrangement of the piston 3, rod 2 and control arm 24 to two separate worm screw gears, each having a single direction of screw pitch, with one worm screw gear 9 having a right hand pitch and the other screw gear 9 having a left hand screw pitch for engagement of the cambered gear 97 clutches during a push or pull force of piston rod 2. In FIG. 6, FIG. 7 and FIG. 9 there is disclosed the application of a cambered gear 97 comprising a round metal plate in circumference to a worm screw gear 9 that is closed at one end, FIG. 3 having a rectangular or square gear 12 opening to its center through which the none rotable worm screw gear 9 reciprocates. In FIG. 6, FIG. 7, and FIG. 9 the other end of the cambered gear 97 is arched and curved with irregular surface indentations throughout its circumference for making clutchable and grippable contact to a second clutch drive plate 11 having indentations 98 to its surface with an opening to its center through which the worm screw gear 9 can freely traverse, with the drive plate 11 being fixed to the inside of the output shaft 25, that is fixed to the housing 81 and that can rotate in one direction only when the worm screw gear 9 makes positive engagement to the FIG. 3 rectangular or square gear 12 (not shown in FIG. 1, FIG. 2, FIG. 5, FIG. 6, FIG. 7, FIG. 8 and FIG. 9).

In FIG.6 and FIG. 7 there is disclosed a method for disengaging and engaging the cambered gear 97 with the clutch 10 in circumference to the worm screw gear 9 and positioned for free engagement to a series of rotatable bearings 33 adapted to a stationary mount 41 inside the output shaft 25.

In FIG. 6, the clutch 10 serves as a freely rotatable backing plate for the cambered gear 97 so that the gear will freely rotate to a reverse or pull movement of the worm screw gear 9. As disclosed in FIG. 6 the cambered gear 97 will make engagement to the FIG.3 rectangular or square gear 12 (not shown in FIG. 6) only during a push movement of the FIG. 7 and FIG. 8 of the worm screw gear 9. This is the application as applied to the friction clutch, a magnetic clutch, or any other clutch, including the cambered gear clutch as illustrated herein.

Figure 8:
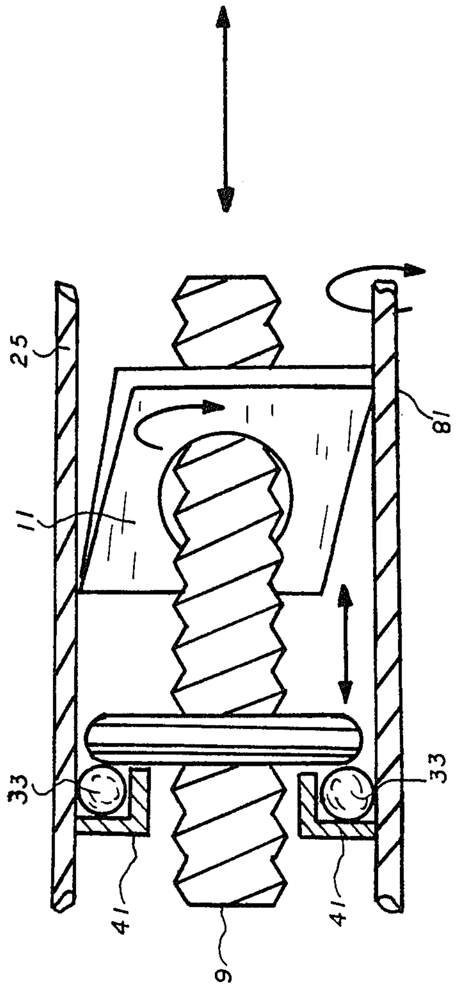
FIG. 8 is a drawing showing the application of a clutch having a rectangular or square gear to its center and its relationship to a drive plate inside the output shaft and a series of bearings as a clutch release mechanism

In FIG. 8 the clutch 10 has a rectangular or square gear (not shown) to its center in which the clutch 10 is driven against a drive plate 11 (as previously explained for the cambered gear) by the push movement of the worm screw gear 9, and during a pull movement to the worm screw gear 9 the clutch 10 rotates freely to bearings 33 (as previously explained).

Illustrative to FIG. 7 and FIG. 9, the cambered gear 97 has a rectangular or square gear (not shown) to its center and in circumference to the worm screw gear 9 with a groove in circumference to the center of its outer surface and with slooping sides in which a series of bearings 33 are positioned so that a forward movement to the cambered gear 97 will cause it to rotate against the drive plate 11 (as explained previously) and a pull or reverse movement will cause it to rotate freely against bearings 33 for disengagement thereof.

In FIG. 5 there is disclosed an entirely different arrangement for engaging and disengaging a series of gates 80 that retain the drive plate 11 and the square or rectangular gear 12 to the worm screw gear 9. The gates 80, that are fixed to the inside of the output shaft 25, are arranged in series throughout the entire length of the shaft having hinged connections 99 for free openign of the drive plate 11 that that contains the rectangular or square gear 12 during a pull or reverse movement of the worm screw gear 9. The force of a push movement of the worm screw gear 9 causes the rectangular or square gear 12 to position itself against the worm screw gear 9 for active engagement in rotating the output shaft 25 in a single direction only.

In FIG. 4 there is disclosed a compound gear arrangement in which the worm screw gear 9 is reciprocatably driven through a rectangular or square gear 12 that comprises a shaft to a sun gear 95 that is connected to a series of planetary gears 20 having shafts 16, with the planetary gears 20 making engagement to an inner ring gear 21 that can serve as the output shaft.

In FIG. 1 and FIG. 2, the clutches 10A and 10B are connected to a hollow inner shaft 55 that slides back and forth through an opening on the center of each of two separate flywheels 13 that are fixed to the output shaft 25 and with counterbalances adapted thereof. During a push movement at the worm screw gear 9 one clutch, either 10A or 10B, is driven against one flywheel 13 by the rotational force of the drive plate 11A or 11B, having the FIG. 3 rectangular or square gear 12 to its center, driven by the engagement of the force of the worm screw gear 9. FIG. 1 and FIG. 2, the second clutch, either 10A or 10B, is forced away from the second flywheel 13 and rotates freely, and only one clutch is actively engaged at any one reciprocatable movement of the worm screw gear 9.

As disclosed in FIG. 9, each worm screw gear 9 has a single direction of pitch only, and on the return force only one clutch mechanism 97 is engaged for driving the drive plate 11 that serves as a flywheel for rotating the output shaft 25. However, as disclosed in FIG. 1 and FIG. 2, the worm screw gear 9 can have a left hand screw pitch at one end and a right hand screw pitch at the other end, which would allow for one worm screw gear 9 to be operational in both directions, in either the forward or the reverse movement, whereby the clutch mechanism, either 10A or 10B, could apply force in rotating the flywheel 13; although it is a vice versa arrangement in that only during the positive screw pitch engagement would there be drive force to the rectangular or square gear 12 (not shown).

As disclosed in FIG. 1 and FIG. 2, although the clutches 10A and 10B will rotate freely during vehicle deceleration and upon braking when the fluid pressure is released at cylinder 1, this can be accomplished by a pressure relief valve (not shown) while the output shaft 25 is still rotating, the preferred embodiment for this invention is the application of clutch 10X positioned either to the drive end of the worm screw gear 9, as shown in FIG. 1, or to the short drive shaft 94 for connection at the universal joint 89, or both. In this manner, there is no possibility of jamming to the drive elements, including the differential 91, the axles 34 and at the wheels 35 during braking or deceleration of the vehicle, as either the worm screw gear 9 or the output shaft, 25 or both, become non operative as a drive element. And the counterbalances 43 provide stored energy for driving regenerative equipment connected to the output shaft 25. (explained fully later)

As disclosed in FIG. 1 and FIG. 2, clutches 10X are electrically operated (wiring not shown in FIG. 2) through wires 37 connected to master switching relay 28 that has multiple contacts for switching to the deceleration switch 29 (that is also the acceleration switch), the brake pedal switch 92 and operator controlled witch 93 that is the master control switch for turning on and off the complete electrical system, including all electrical accessories that would be needed for operating the vehicle. As the operator of the vehicle releases pressure from the accelerator pedal (not shown), that is similar to that of a standard gasoline engine, the deceleration switch 29 (that is the pressure release side to the acceleration switch 29) that is connected to relay 28 through wiring 37 and at clutches 10X, is deenergized and consequently no current is passed from the battery 27 through wires 37 to clutches 10X, causing either one or both clutches to become disengaged and inoperative allowing the output shaft 25 and the worm screw gear 9 to rotate freely and independent of the drive wheels 35.

There is disclosed in FIG. 1 a brake pedal switch 92 that serves the same function at the deceleration switch 29 with the deenergizing of clutches 10X for disengagement of worm screw gear 9 as the operator presses the brake pedal (not shown). Switch 29 also is the acceleration switch (pressure sensitive) that is operative to foot control and when it is pressed switching contacts at master relay 28 are energized at clutches 10X causing engagement of worm screw gear 9 for driving output shaft 25 when clyinder 1 is loaded. Storage batteries 27 not only provide electrical current for operating the electrical switches and clutches as outlined above but also serve as a means for storing electricity that is recovered during acceleration, braking and deceleration of the vehicle by the application of kinetic energy recovery equipment operable to the output shaft 25. (Fully explained later)

In FIG. 1 there is disclosed a 36 volt DC electric motor 38 mechanically connected to a pump 8A by means of pulleys 15D and 15E operative to a dual shaft 16 and belt for pressurizing hydraulic fluid that is fed through pipeline 36 directly to cylinder 1 after passing through electric solenoid directional control valves 66 for input and valves 67 for output at cylinder 1. Valves 66 and 67 are controlled by switching at piston rod 2 and can be either cam operated or the electric solenoid type valve. The preferred embodiment is for the electric motor 38 to operate at 36 VDC and the pump 8A to be a positive displacement rotary gear pump.

In the drawing for FIG. 1, directional control valves 66 also can transmit pressurized fluid to an accumulator 30A for storage under pressure before transmission to cylinder 1, and expended fluid at solenoid valve 67 is returned by pipeline 36 to storage reservoir 31A for return and recyclying at pump 8A. The electric motor 38 and the electric solenoid valves 66 and 67 receive electrical current through wires 37 to the master relay 28 and battery 27 during vehicle acceleration (as explained previously). During braking or deceleration the electric motor 38, through a select switching arrangement at relay 28, serves as a generator for generating electricity that is fed through voltage regulator 49 and wires 37 to storage battery 27. This is accomplished by the application of a pulley 15A connected to the output shaft 25, with a belt 39 connection to pulley 15C at the shaft 16 of the electric motor 38. Electric clutch mechanism 53A is energized by the deceleration switch 29 or brake switch 92 through relay 28 for engaging the pulley 15C and belt 39 to electric motor 38 causing it to operate in reverse.

And upon deceleration, braking or acceleration, FIG. 1, the pulley 15A is positively driven to pulley 15B having a shaft connected to a satellite hydraulic pump 8B for pressurizing fluid, to a compressor 7 for compressing air and to an alternator 5 for generating electricity. Pressurized fluid is fed to a pressure accumulator 30B, compressed air is fed to a storage tank 31B and generated electricity is fed to storage battery 27. However, kinetic energy recovery is controlled by the operator through master control switch 93 that selectively energizes electric clutch mechanism 53B through wires 37 either during vehicle acceleration, braking or deceleration (as previously explained). Compressed air can be reserved for operating an intensifier (not shown) that could be operatively arranged to the cylinder 1 for boosting the pressure therein (no pipelines are shown connecting the elements). This application also could be adaptable to FIG. 2 and FIG. 9 cylinder 1 for driving the worm screw gear 9.

Illustrative of a reverse gear arrangement in which a FIG. 1 gear 90A is arranged in circumference to the output shaft 25 and selectively connected to a second gear 90B slidably adapted to a shaft 16 having a pulley 15H and belt 39 connected thereto and to the output shaft 25 at the universal joint 89 in which the gear 90B is engaged to shaft 16 and for engagement to gear 90A when the operator energizes electric clutch mechanism 53C through switch 93 and master relay 28 for engagement to output shaft 16. Pulley 15H through a connection to the universal 89 and differential 91 provides for reverse gearing to the drive wheels 35.

There is disclosed in FIG. 1, FIG. 5 and FIG. 9 gear arrangements to output shaft 25. In FIG. 5, a main gear 19 is fixed to the output shaft 25 that drives two separate gears 20 connected to two separate utility output shafts 96 that can be used for driving auxiliary equipment. And in FIG. 9 gears 90C and 90B are the drive gears operative to the main output shaft 25 and that connect to a single main gear 90A having a separate output shaft 16 for connection to a universal joint (not shown) and differential (not shown) for driving the wheels of a vehicle (not shown).

The preferred embodiment for this invention is shown in FIG. 9 in which two separate worm screw gears 9 (as previously explained), each having a single and differenct direction of screw pitch, are operatively connected to one cylinder which gives greater efficiency and permits a high speed operation with less heat to the operative elements, as one screw gear would be cooling off while the other would be operational and vice versa. This arrangement also permits the application of a longer screw drive that also is beneficial in that less energy is consumed than with a shorter stroke to the piston 3 and rod 2.

The application of hydraulics is the preferred embodiment, although air or steam also can be used. The satellite FIG. 1 hydraulic pump 8B that pressurizes hydraulic fluid during vehicle braking or deceleration can supply fluid for operating cylinder 1 through connective pipelines (not shown) from accumulator 30B to accumulator 30A or directly to cylinder 1. A cooler (not shown) could be positioned between the pumps 8A and 8B and the cylinder 1 for cooling the fluid during high speed operation. This is not shown because it is common practice for such an application.

The invention claimed is:

1. An apparatus comprising a rotatable hollow output shaft supported externally by bearings with one end of said output shaft being open for the reciprocatable input of a non rotatable worm screw gear operative to a hydraulic motor and to a first clutch mechanism and serving as a drive element to said output shaft with the other end of said output shaft serving as a first driven element operably connected to a second clutch mechanism arranged for operable connection to a second driven element with each said clutch mechanism having two separate inner connecting clutch disc plates arranged for selective engagement/disengagement to said worm screw gear and to said output shaft and said output shaft having fixed therein a first and a second counterbalanced flywheel each having an opening to its center for a slidable second hollow shaft connected therebetween and at each end to a bearing mounted freely rotatable clutch mechanism comprising a clutch disc plate fixed to a clutch drive plate with each said clutch disc plate arranged for engagement to and from rotation to said first flywheel and disengagement to said second flywheel and vice versa and said clutch drive plate having a square or rectangular gear opening to its center proportionate to the width and length and arcuately curved sides of a worm screw gear having a left hand screw pitch at one end and a right hand screw pitch at the other end and that can be reciprocatably driven to slidable bearings adapted inside said output shaft by said hydraulic motor for providing rotation to said square or rectangular gears and to said clutch drive plates, and to said clutch disc plates, and to said flywheels and thereby provide a single direction of rotation to said output shaft.

2. An apparatus comprising at least two separate rotatable and hollow output shafts each externally supported by bearings and with one end arranged as the drive element and the other end arranged as the driven element and having fixed therein at least one flywheel to each said shaft and each flywheel having an opening to its center and in rotatable working relationship to a cambered gear that comprises a round metal plate having a closed end with a square or rectangular gear opening to its center proportionate to the width and length and arcuately curved sides of a worm screw gear and with a groove in circumference to the center of its outer surface having slooping sides in which a series of bearings are positioned that are in working relationship to the inside circumference of said output shaft allowing for free forward or reverse rotational movement thereof when each of two worm screw gears, each having a different and single direction of screw pitch throughout its length, are driven reciprocatably by a common connection to a hydraulic motor causing each said worm screw gear to rotate one said cambered gear against one said flywheel thereby providing rotation to said output shaft and the second said cambered gear to rotate freely away from said second flywheel in disengagement thereof and vice versa.

* * * * *